United States Patent [19]

van Baardwijk et al.

[11] Patent Number: 4,809,263
[45] Date of Patent: Feb. 28, 1989

[54] T-TYPE SWITCHING SYSTEM FOR BROADBAND SWITCHING SYSTEM AND TIME SWITCHING STAGE FOR USE IN A T-STAGE

[75] Inventors: Johannes van Baardwijk; Marinus A. Bos, both of Eindhoven, Netherlands

[73] Assignees: AT&T; Philips Telecommunications B.V., both of Hilversum, Netherlands

[21] Appl. No.: 21,320

[22] Filed: Mar. 3, 1987

[30] Foreign Application Priority Data

Mar. 10, 1986 [NL] Netherlands .................... 8600612

[51] Int. Cl.$^4$ ............................................ H04Q 11/04
[52] U.S. Cl. ........................................ 370/66; 370/63
[58] Field of Search ................... 370/63, 66, 68, 68.1

[56] References Cited

U.S. PATENT DOCUMENTS

| | | | |
|---|---|---|---|
| 3,812,294 | 5/1974 | Pedersen | 370/66 |
| 3,909,786 | 9/1975 | Lawrence | 370/63 |
| 4,386,425 | 5/1983 | Belforte et al. | 370/66 |
| 4,468,765 | 8/1984 | Hensel et al. | 370/63 |
| 4,471,479 | 9/1984 | Waas | 370/66 |

FOREIGN PATENT DOCUMENTS 2026285 1/1980 United Kingdom .................. 370/66

OTHER PUBLICATIONS

"The System X digital switching subsystem (DSS)", by Philips in Systems Technology, Sep. 1979, No. 32.
"Low-Cost Time Division Switch Module for Telephone Switching Applications", by Brady et al., IBM, Tech., Disc. Bulletin, vol. 26, No. 5, 10/1983.

*Primary Examiner*—A. D. Pellinen
*Assistant Examiner*—Geoffrey S. Evans
*Attorney, Agent, or Firm*—Lucian C. Canepa

[57] ABSTRACT

If in a broadband switching system broadcast TV-signals are switched, then it should be preferred that they can be switched through without the risk of blocking. To achieve this it is proposed to distribute the broadcast TV-signals via a p-fold bus line ($BUS_1, \ldots BUS_{64}$) over the 64 inputs ($DTV_1, \ldots DTV_{64}$) of the information stores $IM_1, IM_2, \ldots IM_{256}$. Together with their associated addressing and control, these information stores IM constitute a T-type T-stage switching system. Multiplex signals coming, for example, from the series-parallel converters $SPT_1, SPT_2, \ldots$ of an S-stage of a TST switching system are applied to the further, for example 36, inputs ($I_{out,1}, \ldots I_{out,36}$) of each information store IM. By the action of the time slot control and the addressing associated with each information store IM 36 of the 100 memory locations are read and the contents are applied to the subscribers via outgoing multiplex line OMT. An advantage applied is that all the desired broadcast-TV channels can be switched-through free from blocking.

2 Claims, 5 Drawing Sheets

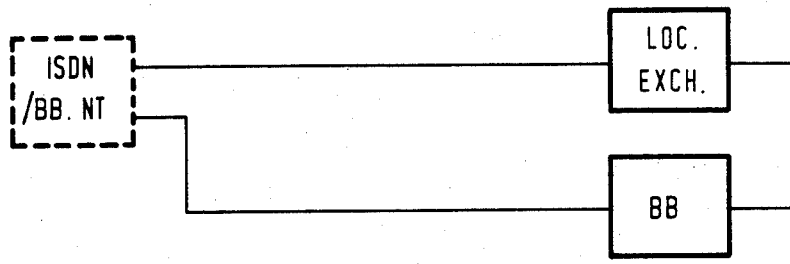
FIG. 1a
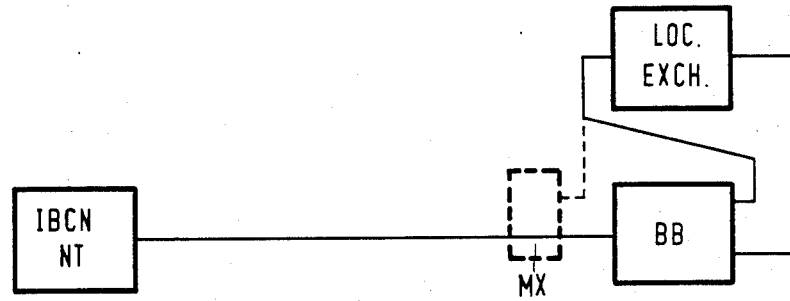
FIG. 1b
FIG. 1c
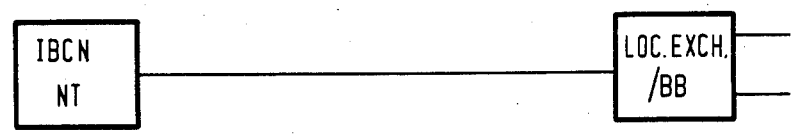
FIG. 1d
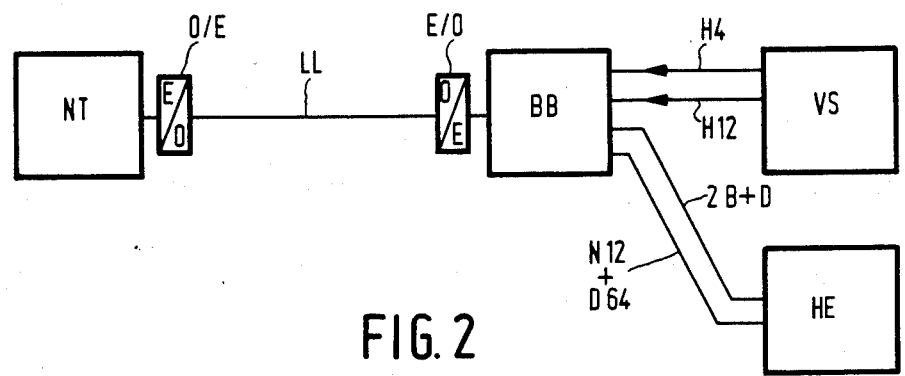
FIG. 2

T-TYPE SWITCHING SYSTEM FOR BROADBAND SWITCHING SYSTEM AND TIME SWITCHING STAGE FOR USE IN A T-STAGE

The invention relates to a switching system of the T-type, comprising n parallel-arranged time switching stages, each comprising an information store having N addressable memory locations and an addressing arrangement connected thereto, the switching system being controlled by a time slot control.

BACKGROUND OF THE INVENTION

In broadband switching systems, broadcast-TV traffic is also processed in addition to ISDN traffic (inter alia telephony, data, video-conference). The broadcast-TV signals are digitized and are usually transmitted at a rate of approximately 34 Mbit/s. For ISDN traffic it is generally permissible for the switching system to have a (small) risk of blocking. In constrast thereto, switching-through of broadcast-TV signals must generally satisfy the requirement that there is no risk of blocking, so that the broadcast-TV signals can be made available for the subscribers in all circumstances. It has been proposed, in European Patent Application EP No. 0 144 076, to use a separate switching system for ISDN and a separate switching system for conferencetelevision and to process the broadcast-TV channels separately therefrom. These last signals are distributed to the subscribers via a bus system. Since TV-signals are not switched, this solution is not so flexible and because of the subdivision on the basis of signal types (ISDN, conference-TV, TV-broadcast) it is not so economical.

SUMMARY OF THE INVENTION

The present invention has for its object to provide a T-type switching system (that is, a switching system of the time-division-multiplex type) with which ISDN-signals, conference-TV signals and also broadcast-TV signals can be switched together, and by means of which more specifically the broadcast-TV signals are switched-through without any blocking. The invention provides a T-type switching system set forth in the opening paragraph, characterized in that the T-type switching system includes a p-fold (that is a p-channel) bus line, that each bus line has one end connected to each time an input of each of the information stores and its other end is connectable to each time one of the possible p signal sources for distributing the p signals from all the p signal sources of the p inputs of all of the n time switching stages, that the information store of each time switching stage has q further inputs for individually connecting a total of $n \times q$ further signal sources and that the time switching stages are each arranged for exchanging $N_1$ ($N_1 < N$) time slots.

The invention further relates to a time switching stage for use in a switching system of the T-type. According to the invention, the time switching stage is characterized in that the information store comprises N memory locations, that the time slot control is arranged for cyclically generating each time $N_1$ addresses ($N_1 < N$) and that an outgoing multiplex line connected to the information store comprises frame each having $N_1$ time slots

BREIF DESCRIPTION OF THE DRAWINGS

An embodiment of the invention and the advantages thereof will now be described in greater detail by way of example with reference to the accompanying drawing. Therein:

FIGS. 1A-1D are an illustration of the expected evolution of ISDN to IBCN (Integrated Broadband Communication Network) for which latter network concept the invention provides a switching system;

FIG. 2 is a circuit diagram of the telecommunication traffic and the composition of that traffic in an IBCN network according to the invention;

DETAILED DESCRIPTION

Figure 3:
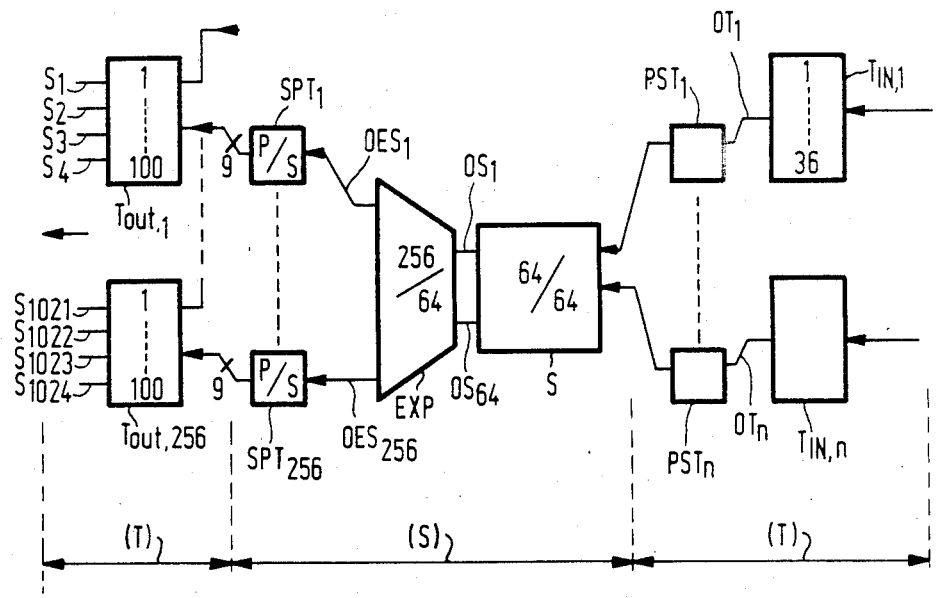
FIG. 3 is a switching system of the time-space-time type according to the invention.

Digitizing the telephone network opened up the possibility of providing a greater diversity of services to the subscribers. In addition to the transmission of telephone traffic in circuit-switched, 64 kbit/s channels, the possibility of utilizing the network also for data traffic was provided. This made possible what is commonly referred to as Integrated Services Digital Network (ISDN). For the transmission between the subscriber terminal (telephone set / data terminal), more specifically the terminating circuit ISDN NT, and the (terminal) exchange (LOC.EXCH.) use is made of the existing 2-wire or 4-wire copper connections (FIG. 1A).

Gradually the need was felt for channels having a much higher rate than 64 kbit/s : particularly for 35-70 Mbit/s channels for broadcast-TV and also for 2-8 Mbit/s video channels for, for example, conference-television. For the transmission of such broadband signals, use can be made of optical fibers. In the first instance, broadband fiber networks can be installed in addition to the existing copper wire networks, a broadband switching system (BB) being introduced in addition to the conventional switching system (LOC.EXCH.) at 64 kbit/s ("overlay"). At the subscriber's side the network can be terminated by means of a combined ISDN/broadband terminating circuit ISDN/BB NT (FIG. 1B). In the future this evolution might result in the signals transmitted till then through the copper wires being conveyed through the fiber, as the channel capacity extension on the fiber this entails is insignificant. Then the two exchanges (LOC.EXCH. and BB) can be connected to the common fiber via a multiplexer MX. It is however reasonable to expect that the ISDN (terminal) exchange LOC.EXCH. in its totality will be connected to the input of the broadband switching network BB is addition to the truly broadband TV and video channels to be switched (FIG. 1C). The multiplexer (MX) then becomes superfluous. In the long run the distinction between the switching system for the ISDN (terminal) exchange and the switching system for the broadband may become less distinct and an integrated broadband terminal exchange LO.EXCH./BB would then take its place (FIG. 1D).

In view of this evolution, and more specifically the last phase thereof, it is necessary to develop a broadband switching network which is suitable both for switching the conventional, interactive 64 kbit/s telephone and data channels and distributive broadband TV-channels (for example 70 Mbit/s) and interactive, for example 2 or 8 Mbit/s video, music and data channels.

The services which can be performed with the aid of a broadband network and a possible structure thereof are shown schematically in FIG. 2. Many broadcast-TV and video sources VS are connected to the broadband switching system BB. The sources suitable therefor are the normal broadcast-TV, pay television, videotelephony, video library, electronic newspaper, etc. The bandwidth of the channels varies between 34 Mbit/s (or 70 Mbit/s) for broadcast-TV (the H4-channels) to 2 Mbit/s for video conferences (H12-channels). In addition, an ISDN exchange HE is connected to the broad band switching system BB. The exchange HE applies to the broad band switching system BB for example 30.B+D64 channels and a number of 2B+D16 channels (30×64 kbit/s +64 kbit/s and 2×64 kbit/s +16 kbit/s, respectively). The switched signals are transmitted to the optoelectrical converter O/E of the subscribers terminal NT via an electrooptical convertor E/O and an optical fiber LL.

FIG. 3 shows a broadband switching system for 1024 subscribers connections. The switching system has what is commonly referred to as a TST (time-space-time) configuration. The ingoing time switching stages $T_{in,i}$ are arranged for switching (i.e. exchanging time slots) of 36 channels of 34 Mbit/s each (H4). 32 of these 36 channels are, for example, directly supplied by broadband signals (for example broadcast-TV), whilst the remaining 4 channels are utilized for the low bit rate channels H12 (pronounce H one two), B, D64 and D16.

Figure 4:
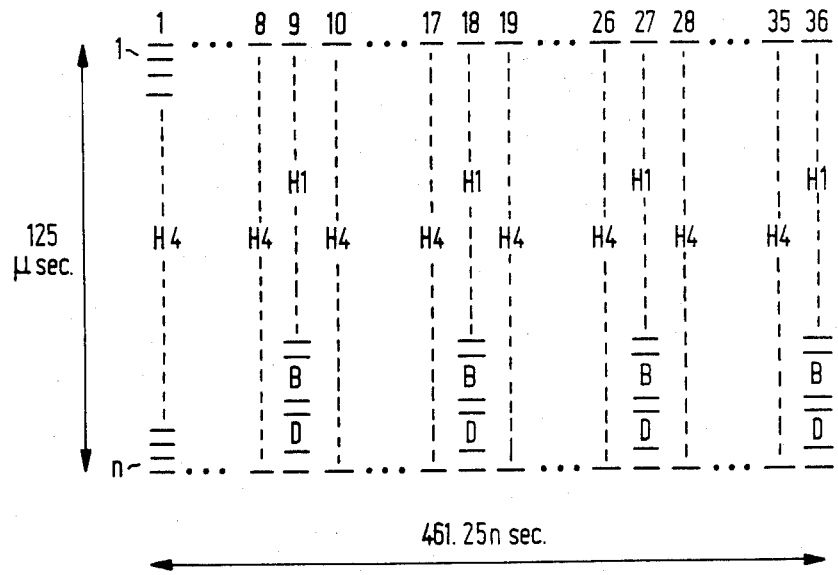
FIG. 4 illustrates the arrangement of frame and subframe of the time-division-multiplex signal to be switched according to the invention.

A time frame comprises 36 time slots, the frame length is 461.25 nsec. A superframe comprises 271 frames and has a duration of 125 μsec. Since 32 time slots of each frame are reserved for the H4 channels, 1084 (4×271) time slots of each superframe are available for the 125 μsec related channels such as H12, B, D64 and D16. These channels are distributed over the 1084 channels as required, for example in a manner as illustrated in FIG. 4. Thus, the time slots 9, 18, 27 and 36 of each frame are reserved for the low bit rate channels, a subdivision being made within each superframe for one or a plurality of H12−/30B−, B− and D−channels.

The further implementation of one of the ingoing time switching stages $T_{in}$ will be described in detail with reference to FIG. 5.

The outgoing multiplex lines OT of the n time switching stages $T_{in}$ are connected to a space switching system S (FIG. 3) by means of which the time slots on the incoming multiplex lines are switched through to the desired outgoing multiplex line by the space switching network S. The structure of the space switching network 5 will be described in detail with reference to FIG. 6.

The outgoing multiplex lines of the space switching network S are connected to the outgoing time switching stages $T_{out}$. In the example shown in FIG. 3 this is effected via an expansion network EXP (1:4). The time switching stages $T_{out}$ route the incoming time slots to the desired subscribers, which are connected to the outputs $S_1, S_2, ... S_{1024}$ of the time switching stages $T_{out}$.

In addition, inter alia the broadcast-TV channels can be additionally connected to the time switching stages $T_{out}$, which channels are distributed over the desired output by the time switching stages $T_{out}$. The details will be described with reference to FIG. 7.

Figures 5, 6:
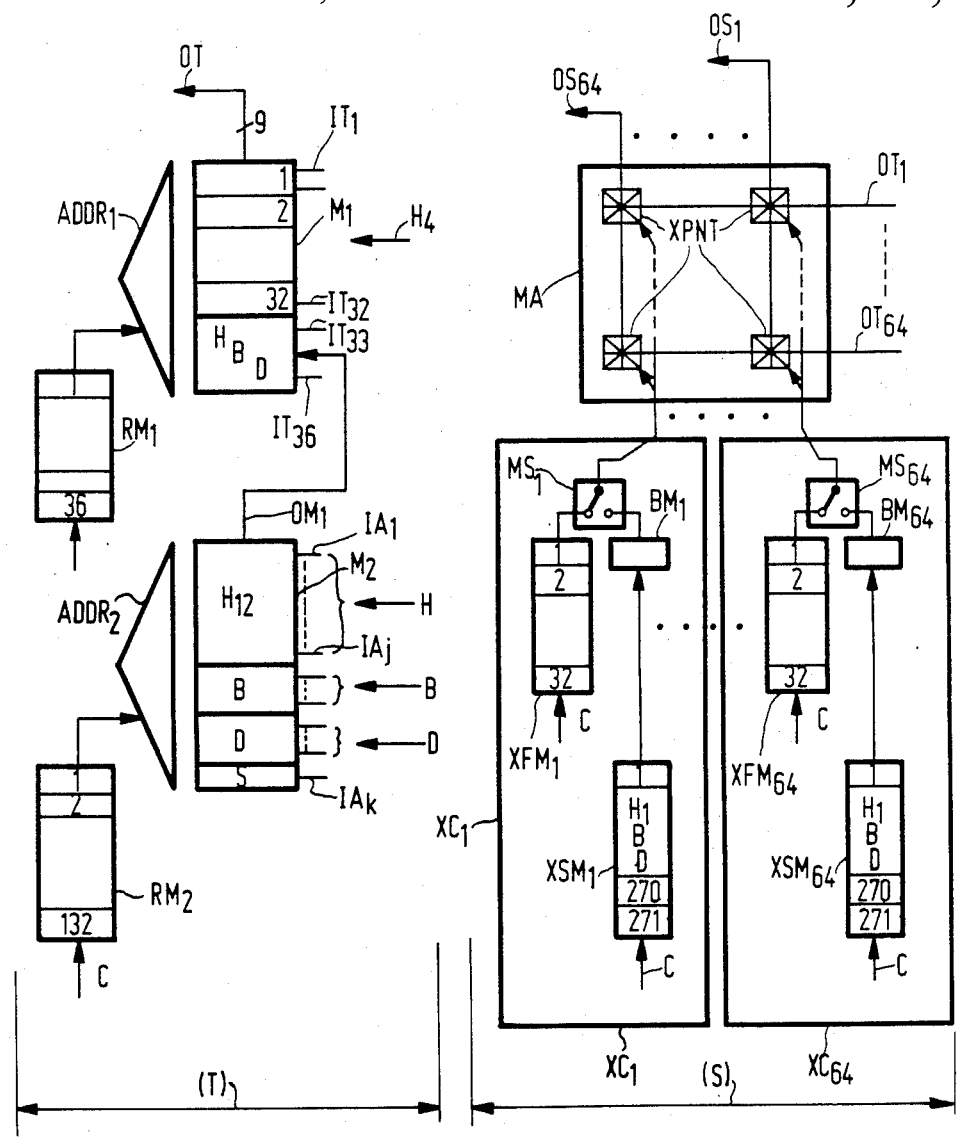
FIG. 5 illustrates an ingoing time switching stage according to the invention.
FIG. 6 illustrates a space switching stage according to the invention.

FIG. 5 shows an embodiment of one of the n ingoing time switching stages $T_{in}$ as shown in FIG. 3. The time stage $T_1$ comprises a first, high bit rate time switching stage comprising an information store $M_1$ controlled by an addressing arrangement $ADDR_1$ and a routing memory $RM_1$. Thirty-two channels of the type H4 are connected to the inputs $IT_1, ... IT_{32}$. These channels (34 Mbit/s) are more specifically intended for video information (conference-TV, TV- programmes having low audience figures, such as documentaries). The outputs $OM_1$ of an information source $M_2$ of a second, low bit rate time switching stage are connected to the remaining four channels $IT_{33}, ... IT_{36}$ of the information store $M_1$. This information store $M_2$ is controlled by an addressing arrangement $ADDR_2$ and a routing memory $RM_2$. The second information store $M_2$ has inputs for a plurality of H12−, B−and D−channels. The precise number of these channels depend on the desired distribution between the number of H12-channels (1.92 Mbit/s), the number of 30B+D64-channels the number of B-channels (2×64 kbit/s) and the number of D-channels (16 or 64 kbit/s). As was already noted in the description with reference to FIG. 4, a superframe comprises 271 frames of 36 time slots each. Consequently 271.(36−32) =1084 time slots are available in each superframe for H12−, B−, D64−or D16−information channels.

The first, high bit rate time switching stage switches the information contained in the (36) memory locations of the information store $M_1$ through to the desired time slot on one of the outgoing multiplex lines OT under the control of the information stored in the routing memory $RM_1$. The routing memory $RM_1$ passes through all its (36) memory locations in one frame period (461.25 nsec). The information stored in a given location of the routing memory $RM_1$ then determines the address of the location in the information store $M_1$.

The second, low bit rate time switching stage switches the information contained in the memory locations of the information store $M_2$ through to an outgoing multiplex line $OM_1$ under the control of the information stored in the routing memory $RM_2$. The routing memory $RM_2$ then passes through all its location in one superframe period (125 μsec).

The channels originating from the time slots switched in the second time switching stage are applied to the four specific inputs $IT_{33}-IT_{36}$ of the first time switching stage $M_1$ and are switched by this first time switching stage together with the other 32 H4-channels to the desired time slot in the outgoing multiplex line OT. The multiplex lines OT are each in the form of a bundle of parallel wires, for each bit of the word present in one time slot one wire of the bundle being used. The example considered here is based on 9-bit words. Consequently, the multiplex lines OT will each contain 9 parallel wires. The bit rate of the multiple lines OT is approximately 78 Mbit/s; on the (four) internal multiplex lines $OM_1$ this rate is however only approximately 8.6 Mbit/s.

The multeplex lines OT are applied to the space switching network S via parallel-series converters $PST_1, ... PST_n$ (FIG. 3).

The space switching network S (FIG. 6) comprises a square matrix MA of cross-point switches XPNT. In the embodiment, 64 columns of 64 cross-point switches each are provided. The outgoing multiplex lines $OT_1, \ldots OT_{64}$ of the time switching stages $T_{in}$ are each connected to a row of switches XPNT of matrix MA. The cross-points belonging to one column are controlled by a cross-point control $XC_1, XC_2, \ldots XC_{64}$. The cross-point control XC comprises a first crosspoint table memory $XFM_1$, a second cross-point table memory $XSM_1$ and a change-overswitch $MS_1$. The fixed contact of change-over switch $MS_1$ is connected to the cross-points of the relevant column. The first switching contact of change-over switch $MS_1$ is connected to the first cross-point table memory $XFM_1$ whereas the second change-over contact is connected to the second cross-point table memory $XSM_1$ via a buffer store $BM_1$. The time slots of the (32) H4-channels are switched by the relevant column of the space switching system S, under the control of the first cross-point table memory, whilst the other channels (H12, B, D64, D16) are switched by the relevant column of the space switching system S under the control of the second cross-point table memory $XSM_1$. By an appropriate drive of switch $MS_1$ the cross-point to be closed is determined on the basis of the value read, originating either from the first cross-point table memory $XFM_1$ or the second cross-point table memory $XSM_1$. Just as for the time switching stages $T_{in}$, the rate at which the information is read from the first table $XFM_1$ (78 Mbit/s) is much higher than the rate at which the information is read from the second table (8.6 Mbit/s).

The time slots thus dynamically switched by the crosspoint controls $XC_1, XC_2, \ldots XC_{64}$ appear on the outgoing spacedivision multiplex lines $OS_1, OS_2, \ldots OS_{64}$.

The outgoing multiplex lines $OS_1, \ldots OS_{64}$ of the space switching network S (FIG. 3) are applied to an expansion network EXP. Using this network, which has an expansion factor of 1: 4, the multiplex lines $OES_1, OES_2, \ldots OES_{256}$ are applied to inputs of the ($4 \times 64 = 256$) outgoing time switching stages $T_{out,1}, T_{out,2}, \ldots T_{out,256}$ via series-parallel converters $SPT_1, SPT_2, \ldots SPT_{256}$ which are included in the lines.

Figure 7:
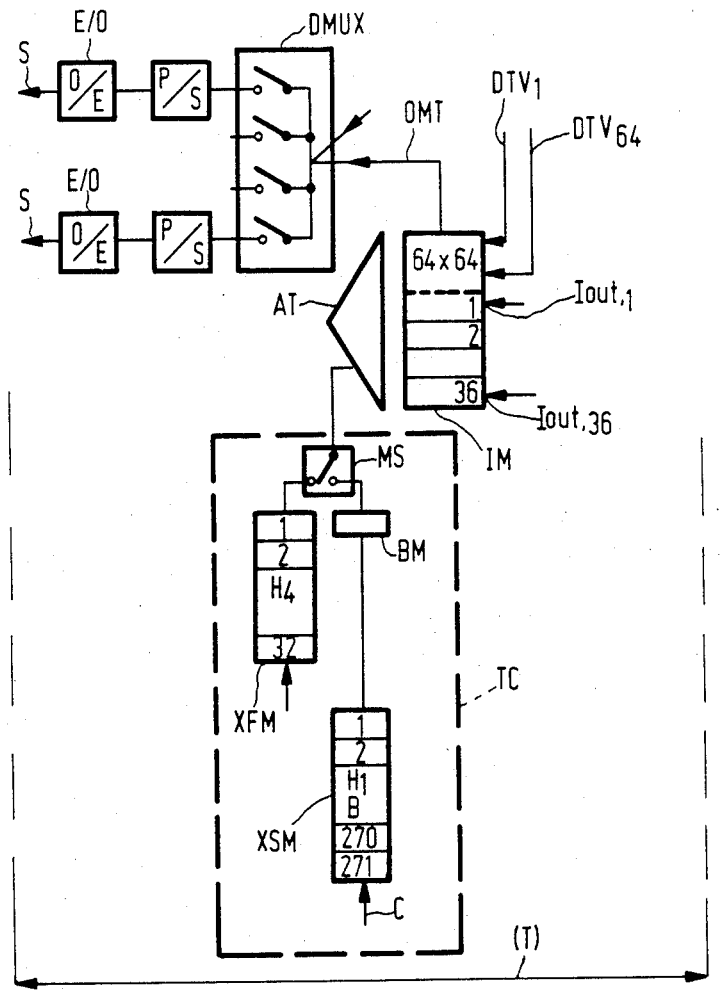
FIG. 7 illustrates an outgoing time switching stage according to the invention.

A time switching stage of the outgoing time switching network $T_{out}$ is shown in FIG. 7.

The time switching stage $T_{out}$ includes an information store IM having 36 inputs $I_{out,1}, \ldots I_{out,36}$ for the connection of 36 multiplex lines (OES, FIG. 3) originating from the space switching system S. In addition, the information store has a number of inputs $DTV_1, DTV_2, \ldots$, for example 64, for connecting a like number of broadcast-TV sources. Hereafter, in the description with reference to FIG. 8, this aspect will be examined in greater detail. The inputs $DTV_1, \ldots DTV_{64}$ for the broadcast-TV sources among the outgoing time switching stages $T_{out,1}, \ldots T_{out,256}$ are arranged in parallel, as a result of which the possibility of blocking broadcast-TV signals having a large audience is made equal to zero.

The information store IM (FIG. 7) is read under the control of a time slot control TC and an addressing arrangement AT. The time slot control TC has a structure comparable to the cross-point control XC described with reference to FIG. 6; hence no further description will be provided. The information stored in the table memories XFM and XSM determine which 36 time slots (from the maximum number of (36 + 64) time slots present) will be read in each frame period and will become available at the outuput multiplex line OMT. The output multiplex line OMT is connected to a demultiplexer DMUX. Tihs demultiplexer demultiplexes the incoming signal into four portions. Each of the four subscribers S connected to one demultiplexer receives 8 H4-channels and also 4 H12-channels and one 2B +D16-channel from the total of 32 H4-channels and 4 mixed (H12, B, D) channels. This represents a bit rate on the subscribers line of $9 \times 34.688 = 312$ Mbit/s.

Figure 8:
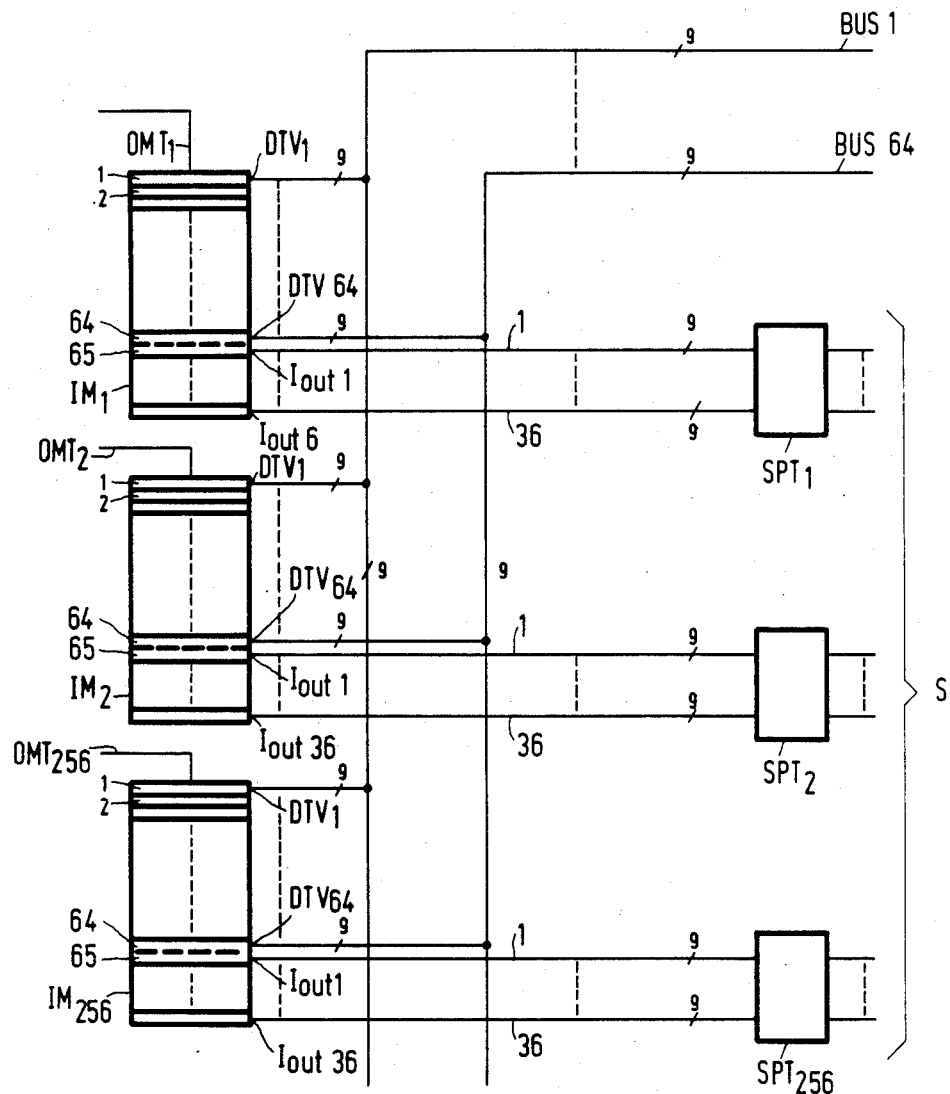
FIG. 8 is a schematic representation of connecting broadcast-TV signals to an outgoing time switching stage according to the invention.

FIG. 8 shows a portion of the outgoing time switching stage of FIG. 7 in greater detail. As many TV-signal sources as there are inputs can be connected to the inputs $DTV_1, \ldots DTV_{64}$ of information stores IM. An input $DTV_i$ of each information store $IM_i$ is connected to a bus line $BUS_i$ to which a TV-signal can be applied. Consequently, all the TV-signals are available at each information store IM. In addition to the 64 memory locations for the TV-signals, each information store has, for example, also 36 memory locations for the signals originating from the space switching stage S which are applied to the inputs $I_{out,1}, \ldots I_{out,36}$ of the outgoing time switching stage via the series-parallel converter $SPT_1, \ldots SPT_{256}$. The time slot control TC (FIG. 7) and the addressing arrangement AT (FIG. 7) are each arranged for switching 36 time slots. On the basis of the data applied to the time slot control it is determined in each cycle which 36 from the 100 possible memory locations must be addressed. The information contained in those 36 locations are switched through to the output multiplex line OMT. Since each information store IM has all the TV-signals available, blocking is prevented from occurring.

FIG. 8 outlines a situation in which the TV-signals are connected to the last stage (the outgoing time switching stage) bypassing the (first portion, the T-S portion of the) switching system. This method should of course be preferred if the TV-sources are available in the region of the switching system. If these TV-signals are not available there then they can of course be supplied via the broadband network. In that case the TV-sources in the form of 34 Mbit/s signals will be switched through by the ingoing time switching stage and the space time switching stage. Predetermined channels can be used for that purpose. The TV-signals which then become available at (predetermined) outputs of the series-parallel converters $SPT_1, SPT_2, \ldots SPT_{256}$ are applied to the bus lines $BUS_1, \ldots BUS_{64}$ and switched through in the manner already described hereinbefore.

Switching through of, more specifically, the TV-signals via the switching system has a number of advantages. In the first place flexibility, since the geographical location of the TV-sources is not important any longer. A second advantage is that because of the fact that predetermined channels are used the demand on the switching capacity is not larger than strictly necessary. A further advantage is, that if it appears that there is a great deal of interest (by the subscribers) for a given signal (for example a TV-documentary for which the general interest was estimated too low), a predetermined channel is adjusted for this specific signal, so that the load on the switching system can be reduced, as the different time slots intended for different subscribers but filled with the same information can be replaced by one time slot. The information in that specific time slot is distributed in said last stage, the outgoing time switching stage, of all the information stores and can consequently be made available for any subscriber.

We claim:

1. A switching system of the T-type, comprising n parallelarranged time switching stages each comprising an information store having N addressable memory locations and an addressing arrangement connected thereto, the switching system being controlled by a time slot control, characterized in that the T-type switching system includes a p-fold bus line, that each bus line has one end connected during each time slot to an input of each of the information stores and its other end is connectable during each time slot to one of the p possible signal sources for distributing the p signals from all of the p signal sources to p inputs of all the n time switching stages, that the information store of each time switching stage has q further inputs for individually connecting a total of $n \times q$ further signal sources and that the time switching stages are each arranged for exchanging $N_1$ ($N_1 < N$) time slots.

2. A time switching stage in a switching system of the T-type as claimed in claim 1, wherein said switching stage includes an information store having addressable memory locations, an addressing arrangement connected thereto and controlled by a time slot control, characterized in that the information store has N memory locations, that the time slot control is arranged for cyclically generating each time $N_1$ addresses ($N_1 < N$) and that an outgoing multiplex line connected to the information store contains frames of $N_1$ time slots each

* * * * *